United States Patent [19]

Shotwell et al.

[11] 4,301,385
[45] Nov. 17, 1981

[54] SUPERCONDUCTING MAGNET ASSEMBLY

[75] Inventors: Kenneth E. Shotwell, Stafford Springs; Albert L. Gaines, West Simsbury, both of Conn.

[73] Assignee: Combustion Engineering, Inc., Windsor, Conn.

[21] Appl. No.: 79,625

[22] Filed: Sep. 27, 1979

[51] Int. Cl.³ .......................................... H02K 44/00
[52] U.S. Cl. .................................... 310/11; 335/216
[58] Field of Search .................... 310/11, 10; 335/231, 335/216

[56] References Cited

U.S. PATENT DOCUMENTS 3,161,807  12/1964  Brogan et al. ................ 310/11 X
3,391,288  7/1968  Kafka ................................ 310/11
3,626,341  12/1971  Dao ................................ 335/216

*Primary Examiner*—Donovan F. Duggan
*Attorney, Agent, or Firm*—William W. Habelt

[57] ABSTRACT

A superconducting magnet assembly (10) having a channel (12) through which a high temperature, high pressure, ionized gas may be passed while immersed in a high strength magnetic field produced therein by a magnet substructure (16) disposed about the channel and a support superstructure (20) for absorbing and equilibrating the repulsive magnetic forces generated within the magnet substructure (16) when the magnet substructure (16) is energized. The inner surface of the magnet support superstructure (20) and the outer surface of the magnet substructure (16) are machined to provide a catenary-shaped interface (24) therebetween.

6 Claims, 5 Drawing Figures

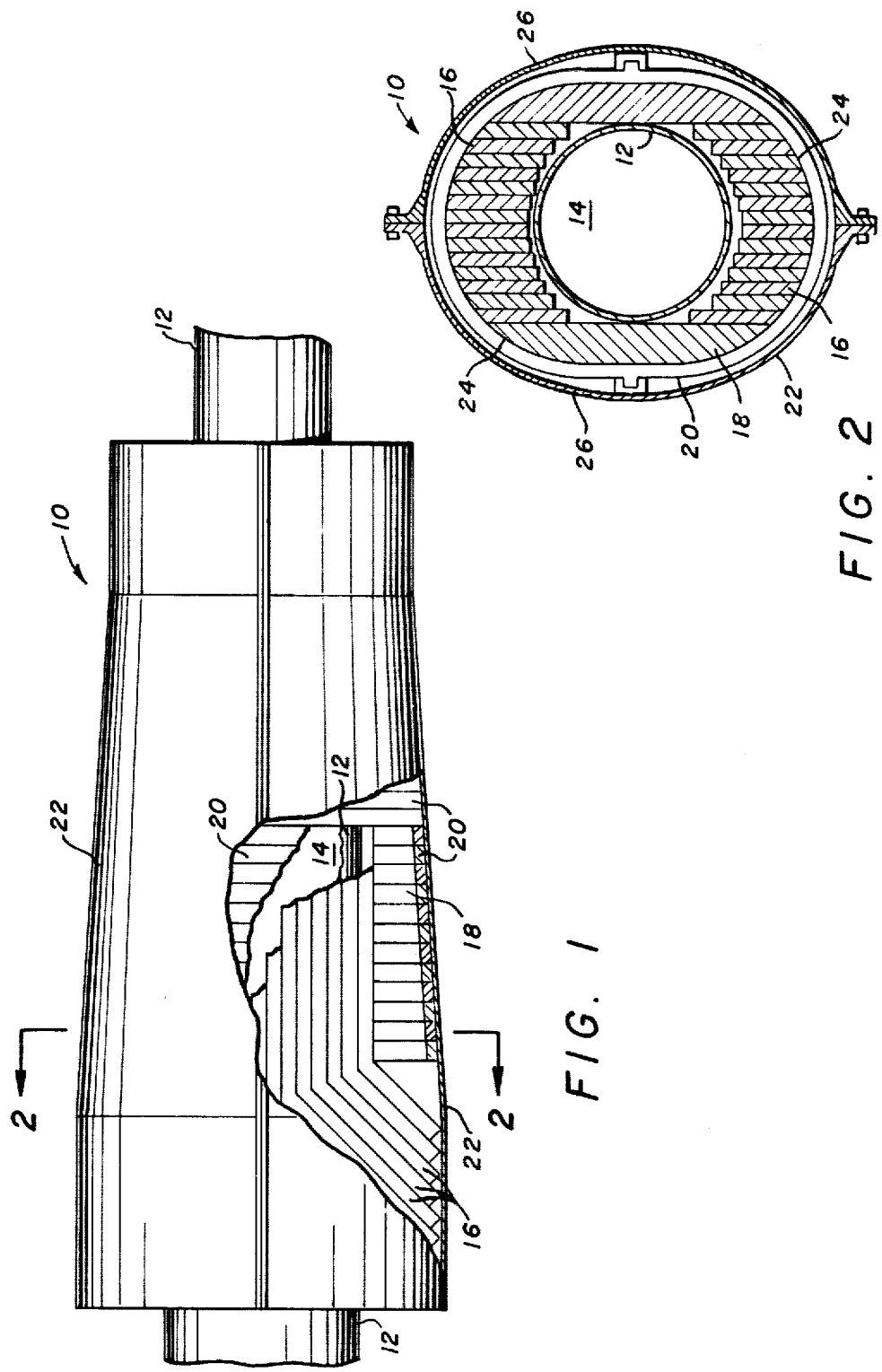

4,301,385

SUPERCONDUCTING MAGNET ASSEMBLY

BACKGROUND OF THE INVENTION

This invention relates to superconducting magnets and, more particularly, to a superconducting magnet assembly suitable for use as a magnetohydrodynamic generator having an improved superstructure for supporting and enclosing the magnet substructure thereof.

Magnetohydrodynamics (MHD) is a method of generating power by directly converting fuel energy into electrical energy. In a MHD generator, fuel is combusted so as to produce a very high temperature, high pressure ionized gas commonly termed plasma. The plasma generated in the MHD burner is passed through a channel immersed in a high strength magnetic field generated by a plurality of superconducting magnets flanking the channel. The plasma passing therethrough induces an electrical current which is gathered on electrodes lining the channel.

Because of the high efficiency associated with the direct conversion mechanism of magnetohydrodynamics, major development efforts are underway to produce commercial scale MHD generators. One problem encountered in designing the commercial MHD generator is providing a superstructure for supporting and enclosing the superconducting magnets which is capable of withstanding the high stresses created when the superconducting magnets are energized.

The superconducting magnet assembly of a MHD generator typically comprises a substructure of a plurality of elongated symmetrical magnet pairs flanking the channel through which the plasma passes. One magnet of each symmetrical pair is disposed on one side of the channel and its corresponding counterpart is disposed on the other side of the channel. When energized, the magnet pairs want to deform into a circular shape. That is, the individual magnets repel each other in inverse proportion to the square of the distance between conductors in which current directions are opposite. Likewise, there is an attraction between conductors in which current directions are the same thereby causing the individual magnets to be attracted in inverse proportion to the square of the distance between conductors. Thus, a magnet unrestrained will deform into a circle so as to equalize the repulsive and the attractive forces so generated.

Additionally, the superconducting magnet assembly must be continuously cooled to near cryogenic temperatures, i.e., near absolute zero, in order for the magnets thereof to maintain their superconductivity. As a result, the superstructure for encircling and supporting the superconducting magnet substructure must not only effectively absorb and equilibrate the stresses generated when the magnets are energized, but must also be designed to utilize a minimum of material mass and to occupy a minimum of volume so as to minimize cooling requirements.

SUMMARY OF THE INVENTION

The present invention provides an improved superstructure for enclosing and supporting a superconducting magnet assembly which most effectively absorbs and equilibrates the repulsive magnetic forces generated within the superconducting magnet assembly and does so in a manner which utilizes a minimum material mass and volume.

In accordance with the present invention, a magnet substructure is provided for producing the high strength magnetic field within the channel through which the high temperature, high pressure ionized gas is to pass, the magnet substructure having a first magnetic pole disposed above the channel and a second magnetic pole, opposite in polarity to the first magnetic pole, disposed below the channel, the outer surface of the first and the second magnetic poles machined to conform to a pre-calculated catenary-shaped curve. A support superstructure for absorbing and equilibrating the repulsive magnetic forces generated within the magnetic substructure when the first and second magnetic poles are energized completely encloses the magnet substructure. The inner surface of the superstructure is also machined to conform to the pre-calculated catenary-shaped curve so as to mate with the outer surfaces of the first and second magnetic poles.

The key to the invention is the catenary-shaped interface providing for mating the outer surface of the first and second magnetic poles of the magnet substructure with the inner surface of the support superstructure. Because of the catenary shape of the interface, the load carried by the support superstructure members will not create a bending moment, but will predominantly be in pure tension and will most efficiently equilibrate the repulsive forces generated within the magnet substructure. Additionally, the mass and volume of material required to construct the support superstructure will be minimized when the substructure interface conforms to the catenary-shaped interface.

BRIEF DESCRIPTION OF THE DRAWING

FIG. 1 is a top view, partly in section, looking down upon a superconducting magnet assembly constructed in accordance with the present invention;

FIG. 2 is a section view taken along the line 2—2 of FIG. 1 showing the preferred embodiment of the support superstructure of the present invention;

BRIEF DESCRIPTION OF THE PREFERRED EMBODIMENT

Figure 3:
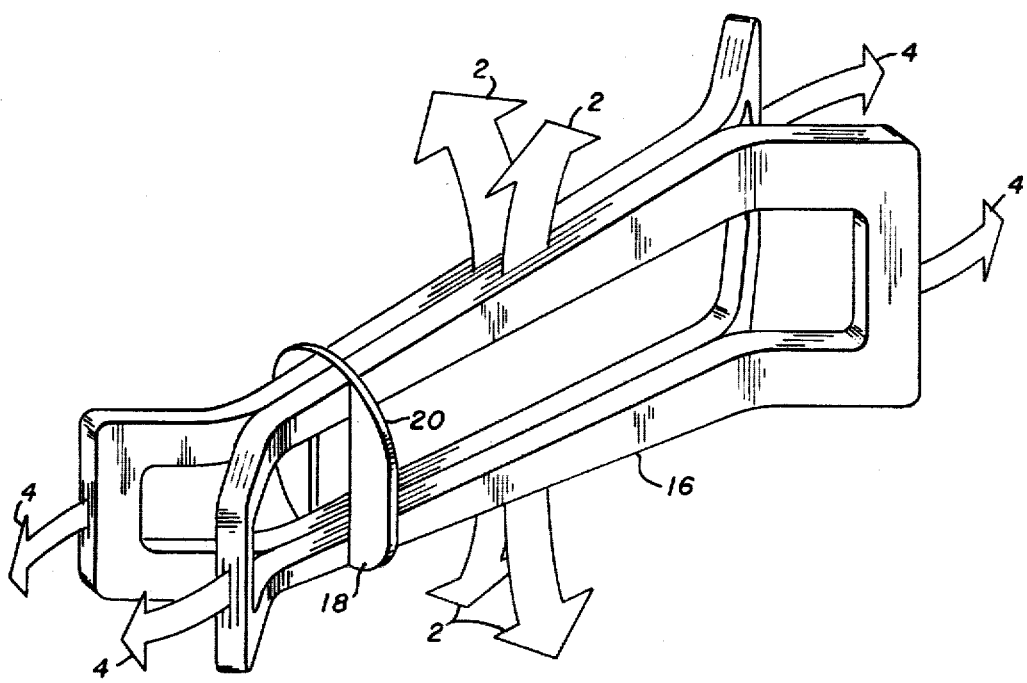
FIG. 3 is a perspective view showing a single support superstructure member enclosing the superconducting magnets and illustrating the forces generated when the superconducting magnets are energized.

Referring now to the drawings, and more particularly, to FIGS. 1 and 2 thereof, there is depicted a superconducting magnet assembly 10 suitable for use as a magnetohydrodynamic generator and constructed in accordance with the teachings of the present invention.

Generally, the superconducting magnet assembly 10 comprises a tubular channel 12, often but not necessarily tubular, defining a flow passageway 14 through which a high temperature, high pressure ionized fluid commonly termed plasma may be passed while immersed in a high strength magnetic field established within the channel 12. A magnetic substructure consisting of a plurality of individual superconducting magnets 16 in the form of elongated, saddle-shaped rings are disposed in parallel planes along the longitudinal axis of the channel as symmetrical pairs, one on one side of and the other at an equal distance to the opposite side of the longitudinal axis of the channel 12. In this manner, the upper halves of the individual superconducting magnets 16 are stacked in a pancake-like fashion so as to form a first magnetic pole disposed above the channel 12 and the lower length of the individual superconducting magnets 16 are similarly stacked in an axisymmetric layer to form a second magnetic pole disposed below the channel 12, said poles being of opposite polarity.

As mentioned previously, when the individual superconducting magnets 16 are energized, they tend to warp out-of-shape by deforming from an elongated, saddle-shaped ring as shown in FIG. 3 into a planar circle. Enclosure loops 20 provide a superstructure for supporting the magnet substructure and prevent the individual superconducting magnets 16 from deforming when energized. A pressure containment shell 22 having end openings through which the tubular channel 12 penetrates completely encloses the superconducting magnet assembly and may also serve to contain the cryogen used to maintain the superconductivity of the magnet pairs.

In accordance with the present invention, a catenary-shaped interface 24 is provided for mating the outer surface of the first and second magnetic poles of the magnetic substructure with the inner surface of the support superstructure. The general shape of the catenary curve is that of the graph of the hyperbolic cosine function and is most commonly associated with the curve assumed by flexible cable of uniform density when such a cable is freely suspended from its ends.

In the present application, the catenary curve is the shape that a flexible member would assume under the actions of the several layers of the magnet pairs, rather than gravity. In order to minimize the space necessary to obtain pure tension in the superstructure members, spacers 18 are provided outside the last magnet layers 16 to provide a transition function. The particular shape of the catenary is unique for the relative loads of each layer to the total load carried by the superstructure. By establishing the catenary shape of the interface, any superstructure support member conforming to the interface will be in pure tension and most efficiently equilibrate the repulsive forces 2 generated within the magnet substructre when the magnets 16 are energized.

In the preferred embodiment of the present invention as best illustrated in FIG. 2, the outer surface of each of the individual superconducting magnets 16 making up the first and second magnet poles of the magnet substructure are machined to conform to a segment of a pre-calculated catenary curve such that when stacked together, as shown in FIG. 2, a continuous catenary interface is provided at the outer surfaces of the magnet substructure. At the sides of the magnet substructure, the catenary shape will be continued by load carrying lateral spacers 18 which provide a continuous transition from the catenary curve to a vertical line at the sidewalls of the magnet substructure thereby avoiding any discontinuity. A series of enclosure loops 20 shaped to conform to the same catenary curve are wrapped around the magnet substructure to form a superstructure comprising a plurality of support bands in pure tension disposed side-by-side along the length of the magnet substructure in planes perpendicular to the longitudinal axis of the channel 12.

Figures 4, 5:
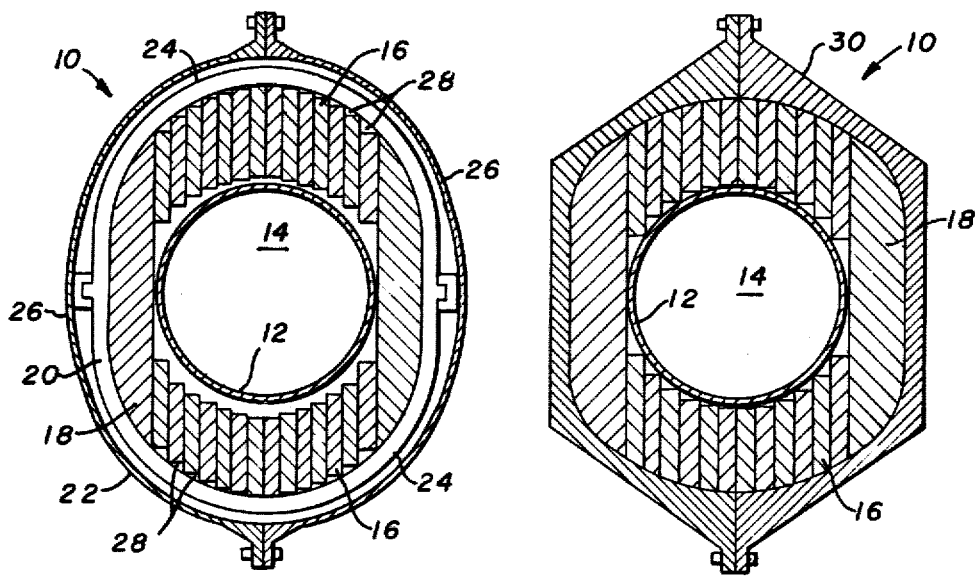
FIG. 4 is a section view taken along the line 2—2 of FIG. 1 showing a first alternate embodiment of the support superstructure of the present invention.
FIG. 5 is a section view taken along the line 2—2 of FIG. 1 showing a second alternate embodiment of the support superstructure of the present invention.

In the alternate embodiment illustrated in FIG. 4, the individual magnets 16 of the magnet substructure are simply rectangular in cross section. That is, the outer edges of the individual magnets 16 are not machined to conform to a catenary curve but are simply planar. A load carrying end spacer 28 is disposed between the outer edge of each of the individual magnets 16 and the enclosure loops 20 to transmit the repulsive magnetic forces 2 generated in the magnet substructure to the enclosure loops 20 of the support superstructure. In accordance with the present invention, the outer edges of the load carrying end spacers 28 are machined to conform to a segment of a pre-calculated catenary curve such that when the magnets 16 are stacked together, a continuous interface 24 is provided along the outer edges of the end spacers 28 for mating with the catenary-shaped enclosure loops 20 of the support superstructure.

Although ideally the enclosure loops 20 would be continous, closed loops, it is considered a practical necessity to construct each of the enclosure loops 20 out of two identical twin halves joined together by closure means 26. In the preferred embodiment the enclosure loops 20 are each formed of an upper and lower half joined together on each side of the magnet substructure by closure means 26. Closure means 26 may consist of a number of functionally equivalent means including, but not limited to, turn buckles, tension plates and shear lugs, and flanges and bolts.

In the alternate embodiment illustrated in FIG. 5, the individual enclosure loops 20 and the pressure containment shell 22 are eliminated in favor of an integral support enclosure and pressure containment shell superstructure 30. The integral shell superstructure 30 is formed from identical twin half, pressure containment shells joined together at their end surfaces along the entire length of the superconducting magnet assembly. In accordance with the present invention, the interior surface of each of the shell halves is machined to conform to and mate with the catenary-shaped interface 24 of the magnet substructure. Thus, a single superstructure is provided which serves not only to optimally absorb and equilibrate the repulsive magnetic forces 2 generated within the magnet superstructure when the magnets 16 are energized but also to contain the cryogen coolant which such a superconducting magnet assembly would typically require.

It may, therefore, be seen that the present invention provides an improved superstructure for supporting and enclosing the superconducting magnet assembly of a magnetohydrodynamic generator. By providing for a catenary-shaped interface between the magnet substructure and the support superstructure, the repulsive magnetic forces generated within the magnet substructure can be best absorbed and equilibrated with a minimal mass and volume of material in the support superstructure and by a superstructure which is in pure tension.

We claim:
1. A superconducting magnet assembly suitable for use as a magnetohydrodynamic generator comprising:
 a. a channel defining a flow passage through which a high temperature, high pressure, ionized gas may be passed while immersed in a high strength magnetic field produced therein;
 b. a magnet substructure for producing the high strength magnetic field within said channel having a first magnetic pole disposed along one side of said channel and a second magnetic pole, opposite in polarity to the first magnetic pole, symmetrically disposed along the opposite side of said channel, the outer surfaces of the first and the second magnetic poles machined to conform to a pre-calculated catenary-shaped curve;

c. a support superstructure for absorbing and equilibrating the repulsive magnetic forces generated within said magnet substructure when said magnet substructure is energized, the inner surface of said superstructure machined to conform to said pre-calculated catenary-shaped curve so as to mate with the outer surfaces of the first and second magnetic poles of said magnet substructure; and d. a pressure containment shell for enclosing therein said magnet substructure and said superstructure, said pressure containment shell having end openings for permitting said channel to penetrate therethrough.

2. A superconducting magnet assembly as recited in claim 1, wherein said magnet substructure comprises:
a plurality of elongated, saddle-shaped superconducting magnet rings disposed side-by-side in planes parallel to the longitudinal axis of said channel as symmetrical pairs, the members of each pair disposed on opposite sides of and equally distant from the longitudinal axis of said channel, thereby forming a first magnetic pole disposed along one side of said channel and a second magnetic pole, opposide in polarity to the first magnetic pole, disposed along the opposite side of said channel, the outer surfaces of each of said plurality of superconducting magnet rings being machined to conform to a segment of said pre-calculated catenary-shaped curve so as to produce a continuous catenary curve along the outer surfaces of the first and the second magnetic poles for mating with said support superstructure.

3. A superconducting magnet assembly as recited in claim 1, wherein said magnet substructure comprises:
a. a plurality of elongated, saddle-shaped superconducting magnet rings disposed side-by-side in planes parallel to the longitudinal axis of said channel as symmetrical pairs, the members of each pair disposed on opposite sides of and equally distant from the longitudinal axis of said channel, thereby forming a first magnetic pole disposed along one side of said channel and a second magnetic pole, opposite in polarity to the first magnetic pole, disposed along the opposite side of said channel; and b. a plurality of load carry spacers disposed between said plurality of elongated, saddle-shaped superconducting magnet rings and said support superstructure for transmitting the repulsive magnetic forces generated within said magnet substructure to said support superstructure, the outer surfaces of said plurality of load carry spacers being machined to conform with and mate to the catenary-shaped inner surface of said support superstructure.

4. A superconducting magnet assembly as recited in claims 1, 2, or 3, wherein said support superstructure comprises:
a plurality of flexible members disposed side-by-side along the length of said magnet substructure in planes perpendiclar to the longitudinal axis of said channel, each of said plurality of flexible members forming a complete enclosure loop about said magnet substructure.

5. A superconducting magnet assembly as recited in claims 1, 2, or 3, wherein said support superstructure comprises:
a. a plurality of rigid enclosure loops disposed side-by-side along the length of said magnet substructure in planes perpendicular to the longitudinal axis of said channel, each of said plurality of rigid enclosure loops comprising identical twin halves having their inner surfaces machined to conform with and mate to the catenary-shaped outer surface of said magnet substructure; and b. connection means for joining the identical twin halves together so as to form a continuous enclosure loop about said magnet substructure.

6. A superconducting magnet assembly as recited in claims 1, 2, or 3, wherein said pressure containment shell further comprises said support superstructure, said pressure containment shell having an inner surface machined to conform to said pre-calculated catenary-shaped curve so as to mate with the outer surfaces of the first and second magnetic poles of said magnet substructure.

* * * * *